Figure 1:
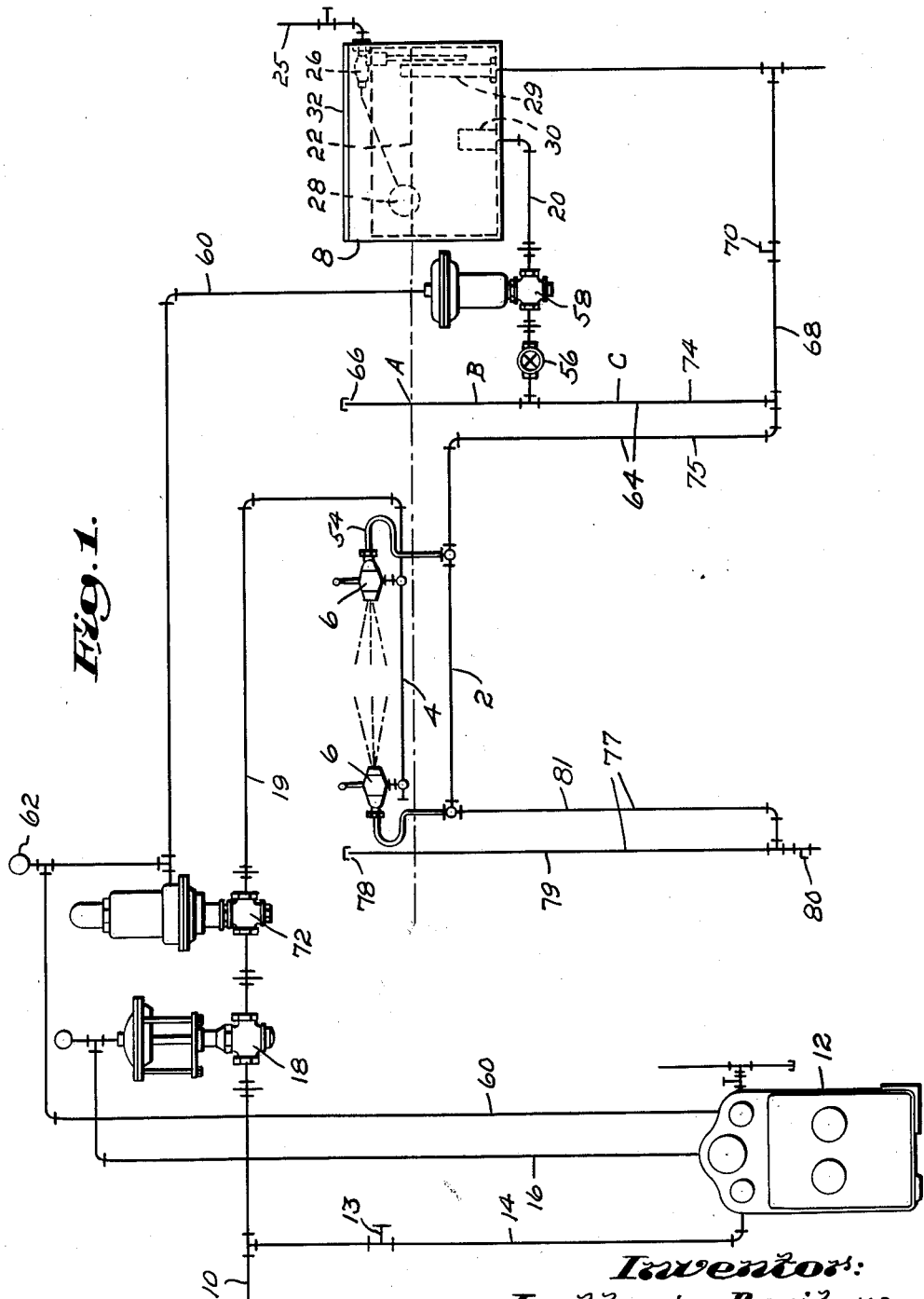

April 11, 1961 L. BAILEY 2,979,266
MODULATING SYSTEM FOR HUMIDIFICATION OF ENCLOSURES
Filed June 24, 1957 3 Sheets-Sheet 1

Inventor:
Luther Bailey,
by Porter, Chittick & Russell
Attorneys

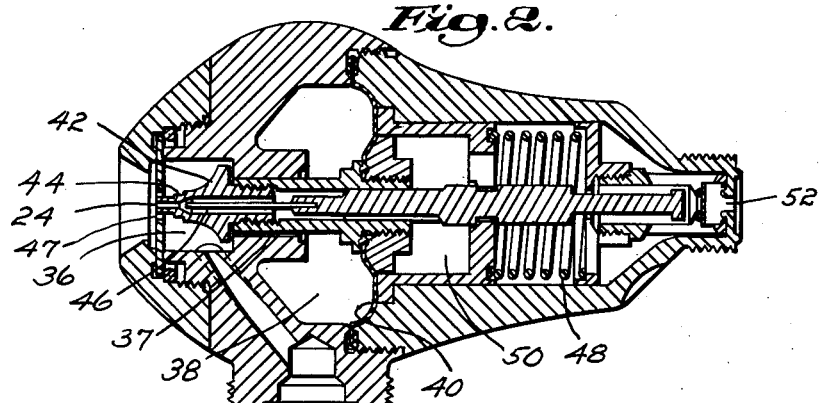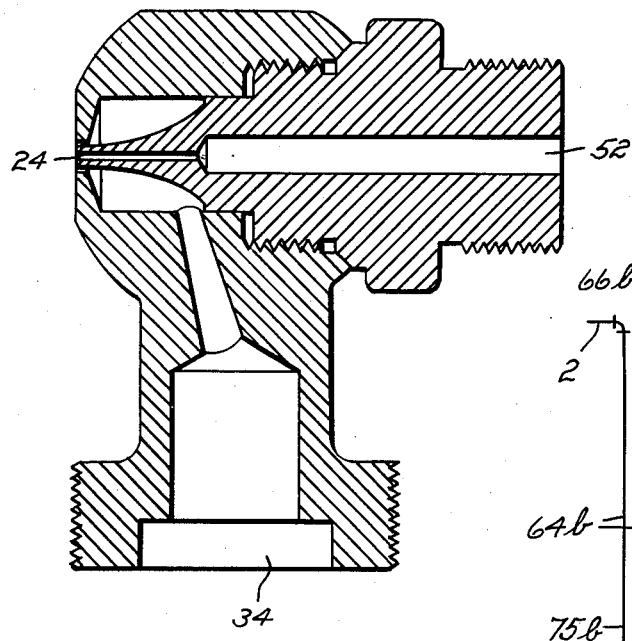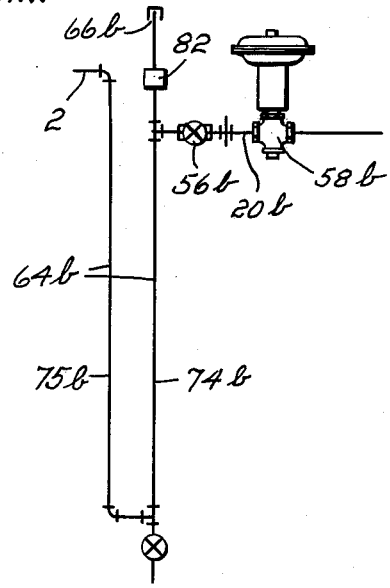

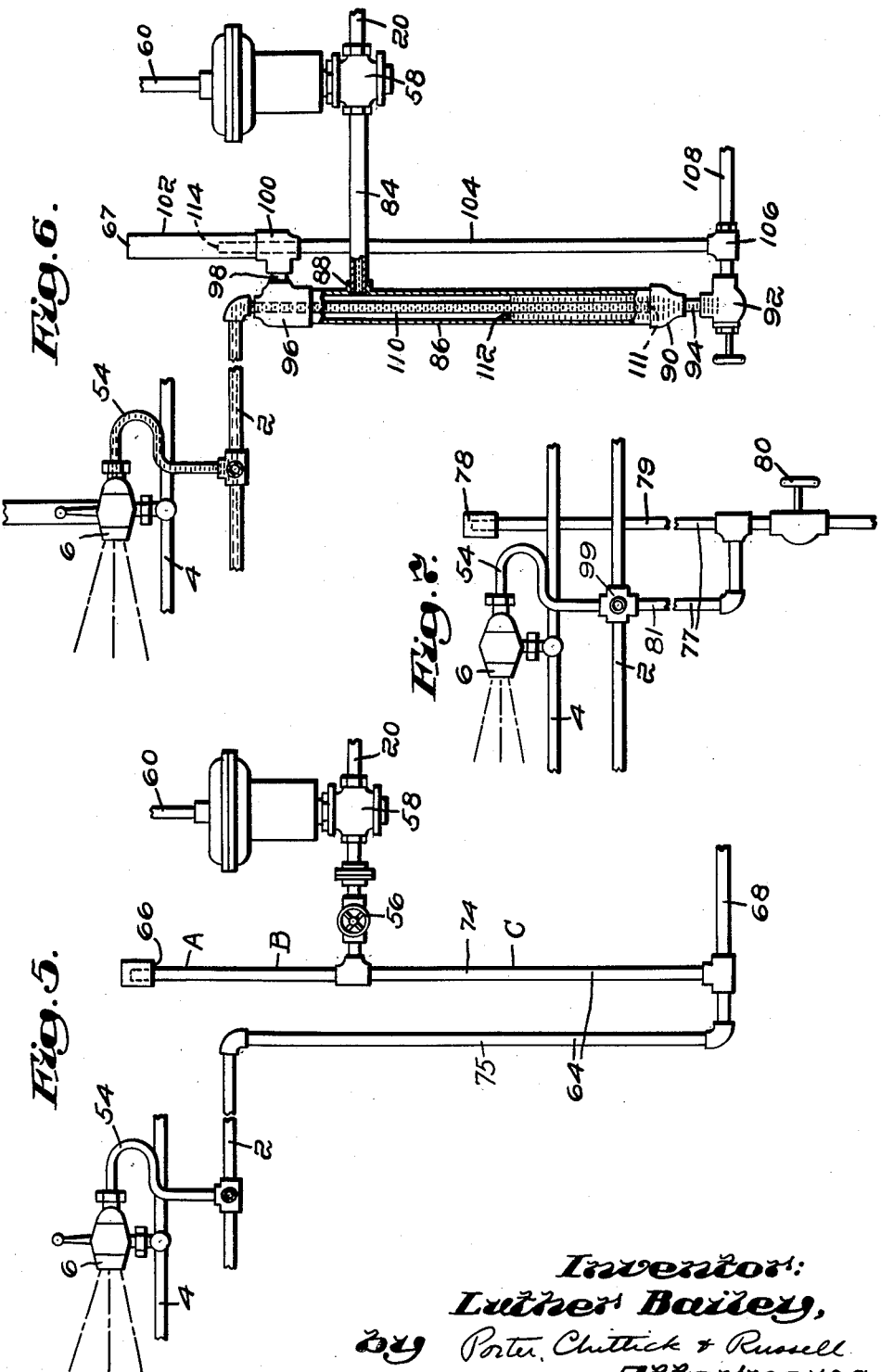

the humidity control system will become readjusted to maintain a lower room humidity. As far as I know, the Loepsinger apparatus has never been used commercially.

United States Patent Office
2,979,266
Patented Apr. 11, 1961

2,979,266

MODULATING SYSTEM FOR HUMIDIFICATION OF ENCLOSURES

Luther Bailey, Charlotte, N.C., assignor to Parks-Cramer Company, a corporation of Massachusetts Filed June 24, 1957, Ser. No. 667,360

6 Claims. (Cl. 236—44)

This invention relates to improvements in humidifying systems and methods for controlling the humidity in enclosures. The invention relates particularly to systems using humidifiers of the atomizer type to which air is fed under superatmospheric pressure and to which water is fed either under superatmospheric pressure or from a reservoir in which water is ordinarily maintained at a level below the outlet nozzles of the humidifiers.

When water is not under positive pressure at the atomizers but instead is maintained in a container in which the level is below the humidifiers, compressed air issuing from an atomizer nozzle causes a negative pressure to exist in the water passages in the nozzle and in the water supply pipe, and thus induces a flow of water through the nozzle from the lower level of the container. Humidifying systems operating in this fashion have been widely used in textile mills and other industrial plants for more than fifty years. Such atomizer systems are commonly referred to synonymously as of the "gravity" or "suction" type.

In the usual atomizer system of the gravity or suction type humidification operates alternately on a "full-on" and "full-off" basis. Control is usually automatic in accordance with the relative humidity of the room atmosphere. Whenever compressed air is supplied to the humidifiers, water is caused to flow and a fine spray or fog issues. When the air flow is shut off, the spray stops.

Heretofore as far as I know, no satisfactory method has been devised to modulate or vary gradually and automatically the spray output of an atomizer system of the gravity or suction type.

In U.S. Patent No. 2,434,421 granted to Loepsinger January 13, 1948 the inventor discloses a regulating apparatus for automatically varying the water level in a tall water supply tank for an atomizer in accordance with changes in room temperature, humidity, or both. By means of mechanism including a bellows controlled by the atmospheric conditions and connected to a toggle linkage, a valve in the main water supply pipe, and a long vertical float, Loepsinger maintains a water level in the tank directly related to the room condition and thereby limits the output of each atomizer fed from the supply tank. Although Loepsinger recommends using a humidity controller to shut his atomizer off abruptly when humidity rises close to the maximum level desired, he states that the controller (not shown) may be omitted under certain conditions. When used, this controller serves to limit the extent of modulation of mositure output of the atomizers. However, with or without the controller, it is only when the atomizers operate over a considerable range of variation in water level that the Loepsinger invention is of any significance. When so operated the Loepsinger method has the inherent disadvantage that if the system is maintaining the desired room humidity with output of the humidifiers reduced automatically by the humidity regulator, then as one or more atomizers become dirty and less efficient in atomizing effect, the amount of water discharged will decrease Another means for directly varying the water level to a system of atomizer humidifiers of the suction type is disclosed in French Patent No. 587,315 to Lanquetin dated April 16, 1925. Lanquetin's means consisted of supporting a water supply reservoir on a cable running over a fixed pulley, whereby the entire reservoir could be raised or lowered to any desired position relative to the humidifiers. I know of no commercial use ever being made of this apparatus. Space limitations in the ordinary room and the necessity of using flexible water connections or their equivalent contribute to the impracticability of this method.

Attempts to vary the output of atomizer humidifiers of the suction type by varying the air pressure while maintaining a constant water level have proved impracticable. With the water level maintained only slightly below the humidifiers, any reduction in air pressure sufficient to reduce appreciably the rate of spray output usually results in the spray becoming too coarse. Fine spray and consequent quick evaporation of the spray particles are considered essential in proper humidification of most industrial plants.

Attempts to vary output of atomizer humidifiers of the suction type by merely inserting a valve in the water pipe between the water tank and the humidifiers of the conventional system also have been unsatisfactory. As soon as the flow of water is throttled by use of such a valve, performance of the humidifiers is likely to become very erratic. When flow of water through the valve becomes less than the atomizers are delivering, the partial vacuum in the water pipe immediately increases and spray output is thus reduced. Under these circumstances reliable modulation of spray output of the humidifiers is difficult to secure and so far as I am aware has never been achieved on a commercial basis.

If the foregoing arrangement is modified by adding a vent to atmosphere in the water pipe between the valve and some of the atomizers, throttling of the valve results in limiting flow of water to the atomizers, but since water level does not change appreciably the atomizers will continue to spray at close to their full evaporative capacity until water in the pipe between valve and humidifiers is used up, whereupon the atomizers will stop spraying until flow through the valve provides an additional supply. Under these conditions operation of the atomizers will be characterized by alternate spraying and no spraying or spasmodic spitting.

One object of the present invention is to provide a simple, practical, and economical means of modulating the evaporative output of atomizer humidifiers by use of a throttling valve in the water supply pipe with added means beyond the valve for ensuring smooth operation of the humidifiers at reduced output, thus to keep room humidity conditions more uniform.

Another object of the invention is to provide means to convert an atomizer system which is designed to operate with water as well as air always under superatmospheric pressure to a system in which water pressure is varied all the way from superatmospheric to subatmospheric, and to modulate the spray output of such humidifiers over a wide range.

Another object of the invention is to provide a deep pocket, U, or equivalent, in the water pipe to the humidifiers of an atomizer system of the gravity or suction type together with a gradual-acting valve at the water supply end of this pipe, whereby when the rate of flow of water through the valve is reduced to less than the total rate of spray output of the humidifiers operating on the pipe, a lower water level will be established in the pocket and the humidifiers will continue to deliver spray but at the reduced rate as a result of the increased lift.

Another object of the invention is to provide a gradual-acting valve in the compressed air supply pipe to an atomizer system of either of the modified types mentioned in the two preceding paragraphs which air valve is operated in conjunction with the gradual-acting water valve so that as the flow of water is restricted air pressure will simultaneously be reduced, thus to lessen the amount of air supplied to the humidifiers with resulting economy in operation of the system.

It is clear that the basic principle of the invention lies in restricting the rate of water supply and in independently permitting a variable water level to be maintained in a pocket in or otherwise associated with the water pipe to a system of atomizer humidifiers, so that total moisture output of the humidifiers will quickly become equal to the reduced rate of flow through the valve. The various objects outlined above and others will be apparent from the following description, accompanying drawings and claims.

An illustrative embodiment of the invention is shown by the drawings in which

Fig. 1 is a diagrammatic elevational view of a typical humidifying system embodying the invention.

Fig. 2 is a detailed view largely in section of a typical atomizer of the self-cleaning type.

Fig. 3 is a similar view of a typical atomizer not having the self-cleaning feature.

Fig. 4 shows the water supply portion of Fig. 1 modified to apply to a system of atomizers designed to operate with water as well as air under superatmospheric pressure.

Fig. 5 is an enlarged view of part of the piping shown in Fig. 1.

Fig. 6 is a modified form of piping capable of acting in the same manner as that of Fig. 5.

Fig. 7 is still another modified form of piping.

Referring to Fig. 1, a typical system of atomizers of the gravity or suction type for vaporizing water within an enclosure includes a horizontal water pipe 2, an air pipe 4, atomizers 6, and constant level water tank 8. Compressed air at some convenient pressure such as 30 pounds per square inch gage enters the system through pipe 10 from a compressor plant not shown. Operation of atomizers 6 is usually controlled automatically by a humidity sensitive regulator of a suitable type represented as 12 to which compressed air is piped through pipe 14 at a predetermined pressure which may be controlled by pressure reducing valve 13. Air pressure from humidistat 12 is piped through pipe 16 to valve 18 in main air supply pipe 19 leading to pipe 4 to which the humidifiers are connected.

Water pipe 2 to which the humidifiers are also connected receives water through pipe 20 from constant level water tank 8. Normal water level shown at 22 is usually about 4″ below the water orifice 24 (see Figs. 2 and 3) of the atomizer, such water level usually being maintained by water valve 26 at the end of water pipe 25 connected to any convenient water supply under pressure. Water valve 26 is controlled by ball float 28 in the well known manner. A removable overflow pipe 29 open at top and bottom and connected to drainage below provides a safeguard against possible failure of valve 26 to close when the proper water level is reached. A water strainer such as 30 in the outlet of tank 8 is customarily included and a loose fitting cover 32 over the tank provides an additional means to prevent dust, etc. from entering the water system.

Referring to Figs. 1 and 2, whenever atmospheric humidity in the enclosure is less than the percentage for which humidistat 12 is adjusted, control pressure in pipe 16 keeps normally closed valve 18 in open position allowing compressed air to reach humidifiers 6 through pipes 19 and 4, air inlet 34 and front air chamber 36. Air from chamber 36 finds its way through a restricted passage 37 to rear air chamber 38. Pressure of air in chamber 38 keeps diaphragm 40 expanded hard to the right as shown, holding water tip 42 with air cleanout surface 44 as well as water cleanout pin 46 and all associated movable parts in right hand positions against compressed helical spring 48. Air from chamber 36 issues through annular air orifice 47 as a cylinder of high velocity air surrounding water orifice 24. This issuing air induces a partial vacuum in water orifice 24, water chamber 50, water inlet 52, and water connecting tube 54. In the face of this partial vacuum, atmospheric pressure on the surface of the water in tank 8 forces water upwardly through tube 54, through the humidifier and outwardly via orifice 24, with resulting generation of spray of sufficient fineness to be evaporated more or less satisfactorily into the atmoshpere of the enclosure under ordinary conditions of temperature and humidity.

When humidity of the room atmosphere rises to an extent which causes humidistat 12 to respond, control pressure in pipe 16 is reduced and valve 18 closes abruptly, flow of air to humidifiers 6 ceases and no spray issues. As previously stated, this conventional system of humidification consisting of the elements just described has the disadvantage of operating intermittently full-on and full-off with resulting alternate over-humidification and under-humidification of the enclosure.

Now referring further to Fig. 1, a preferred embodiment of the invention consists of using in combination with the elements previously enumerated, the following additional pieces of equipment.

A valve is included in the water pipe between water tank 8 and the humidifiers 6. This valve may be of the manually-operated throttling type represented at 56 but preferably it is of the automatic throttling type represented at 58, or both types may be used. When automatic valve 58 is used, valve 56 is normally kept fully open and used only for manual control under special circumstances as when valve 58 is being repaired.

Between valve 56 and/or valve 58 and the humidifiers 6 a deep pocket is built into the water conduit. Desirable depth and cross-sectional area of this pocket are referred to below. This pocket may take the form of a U in the piping as shown at 64 in Figs. 1 and 5 or some equivalent such as shown in Fig. 6 may be used. The pocket 64 comprises first and second legs 74 and 75. It is advisable that this pocket be vented to the atmosphere as indicated at 66 in Figs. 1 and 5 and at 67 in Fig. 6. It is further advisable that provision be made for occasional drainage of the pocket by a connection to waste shown at 68 in which is located hand valve 70 of any convenient type.

For the purposes of more easily securing a wide range in evaporative output of the humidifiers as well as better economy in the use of compressed air, an automatic gradual-acting valve 72 in air pipe 19 to the humidifiers may be used in conjunction with automatic gradual-acting water valve 58 in water pipe 20. Desirably these gradual-acting valves are controlled simultaneously by compressed air at variable pressure from the humidistat 12 through pipe 60. Control pressure to valve 58 and/or valve 72 is indicated by gage 62 at any convenient point. When gradual-acting air valve 72 is used and when pocket 64 is of ample depth it may be considered unnecessary to use the full-on and full-off air valve 18.

The preferred embodiment of the combination system of the invention illustrated by Fig. 1 operates as follows: When the humidifying system is put into operation after a shut-down period, room humidity is usually well below the desired level. When starting the system, normally closed air and water valves 18 and 58 will open and pipes 20, 64, 2 and 54 will fill with water to the normal level 22. The water lift from level 22 to the atomizer orifice 24 is about 4″. Consequently the humidifiers will start operating at their full normal evaporative output under the influence of air pressure supplied through pipe 4. As room humidity approaches the percentage for which humidistat is adjusted, pressure in air control pipe 60 gradually decreases. Normally closed but now open water valve 58 begins to restrict the flow of water in pipe 20. As soon as this flow becomes less than the total rate at which all the humidifiers 6 are together delivering spray to the atmosphere, the water level in pipe or leg 74 of pocket 64 immediately begins to drop from its initial level at 22 or A. As a result of the water level falling to some lower point B, the lift against which the atomizers operate is increased. Consequently with the air pressure to the humidifiers remaining constant the amount of spray or fog which the humidifiers 6 deliver is reduced.

As relative humidity in the atmosphere of the enclosure rises still closer to the percentage for which humidistat 12 is adjusted, water valve 58 further restricts the flow of water in pipe 20. If weather conditions, etc. remain unchanged, a stable condition in the rate of humidification will be reached when the water level in pipe or leg 74 of pocket 64 drops to some point C. Total output of the humidifiers then may be only a small fraction of what it was when the water level was at A.

Any change in the rate of humidification required to maintain the predetermined percentage of humidity for which humidistat 12 is adjusted will cause the humidity to rise or fall. This rise or fall will be promptly sensed by humidistat 12 and will result directly in a change in the restrictive effect of valve 58 and indirectly in water level C in pipe 74 and in the rate at which spray is discharged from the humidifiers. Thus the humidifiers may continue to operate for indefinite periods, their output being modulated from time to time as required by humidistat 12 so as to maintain room humidity at or near the desired percentage.

When under conditions of restricted flow of water through valve 58 one or more of the humidifiers 6 becomes dirty or for some other reason less efficient in atomizing ability, reduction in total spray output will immediately result in a rise in water level in pipe 74 (flow through valve 58 being unchanged) which in turn will increase spray output particularly of those humidifiers which are in good operating condition, thus restoring total spray output to agree with the rate of flow of water through valve 58. It is to be emphasized that water level in pocket 64 is not directly controlled when flow through valve 58 is restricted, but is allowed to assume any position it will, dependent upon the water lift necessary to make total evaporative output equal exactly the controlled rate of flow of water through valve 58 and/or valve 56.

If, for example, the system contains ten atomizers and if with output restricted they are delivering a total of 60 pounds of water per hour to the room (an average of 6 pounds per atomizer) and one atomizer stops spraying, then the output of the remaining nine atomizers will be stepped up to deliver the same total of 60 pounds of water per hour, because the water level in pocket 64 will rise to a higher level and each of the nine atomizers will then deliver on the average 6⅔ pounds per hour instead of the previous 6 pounds per hour. Conversely in the above case restoration of the stopped atomizer to service will not increase total output because the water level will then fall to a point at which the output of all atomizers equals the flow through valve 58.

When, as is desirable, gradual-acting air valve 72 is used along with or in place of on-and-off valve 18, evaporative output of humidifiers 6 is affected by the variable air pressure supplied to them as well as by the variable water level in pocket 64. The importance of these variations is illustrated in the following table, which shows pounds of water evaporated per hour per atomizer at different water levels and at different air pressures as determined by actual tests on a typical atomizer of the type shown in Fig. 3.

*Pounds of water evaporated per hour per atomizer*

| Water Level Below Atomizer | Air Line Pressure, lbs. per sq. inch gage | | |
| --- | --- | --- | --- |
|  | 30 | 25 | 20 |
| 4″ | 8.0 | 7.3 | 6.3 |
| 10″ | 6.5 | 5.8 | 4.9 |
| 16″ | 5.2 | 4.5 | 3.7 |
| 22″ | 4.3 | 3.6 | 2.9 |
| 28″ | 3.6 | 2.9 | 2.2 |
| 34″ | 3.0 | 2.3 | 1.6 |
| 40″ | 2.5 | 1.7 | 1.0 |
| 46″ | 1.9 | 1.1 | .4 |

As previously stated, normal water level for full capacity operation is 4″ below the atomizer. Note that at a fixed air pressure of 30 pounds per square inch evaporative output varies from 8.0 pounds per hour at normal 4″ water level to 1.9 pounds per hour at a water level 46″ below atomizer. At 4″ water level, reducing air pressure from 30 pounds to 20 pounds reduces evaporative output from 8.0 to 6.3 pounds or 21 percent. When water level is 46 inches below atomizer the same decrease in air pressure reduces evaporative output from 1.9 to .4 pounds, or 79 percent. The effectiveness of changes in both water level and air pressure is thus clearly demonstrated.

An additional advantage in varying air pressure as water level is varied results from the saving in compressed air at the lower pressures. In cases where still further saving in compressed air is desirable, the on-and-off air valve 18 may be used as well as the gradual-acting air valve 72. The on-and-off valve 18 shuts off the atomizers entirely at some pretermined point of low evaporative output represented by a small deficit in the prevailing room relative humidity as compared with the established value.

In some instances it may be desirable to limit the output of the humidifiers when room temperature is low, as on starting the system on a cool morning, even though room humidity may be very low. In such cases humidistat 12 may have associated with it a thermostat to restrict air pressure in pipe 60 to valve 58 and so limit maximum output of the humidifiers until room temperature reaches a predetermined level. This thermostat may be of any suitable type and may be entirely separate and independent of humidistat 12. In some instances a thermostat may be the only instrument automatically controlling valve 58, humidistat 12 being dispensed with. In other instances where close control of room humidity is not essential both humidistat and thermostat may be omitted, control of moisture output of humidifiers 6 being by manual adjustment of valve 56 as previously described.

The invention is applicable to a wide variety of atomizer systems of the gravity or suction type of which the layout diagrammatically shown in Fig. 1 is a typical example, and in which the atomizing nozzles may be of any design such that spray will be discharged by air under superatmospheric pressure when water pressure at the nozzle is subatmospheric. Figs. 2 and 3 are two representative examples of such nozzles.

Some atomizing nozzles designed particularly for operation with both water and air under superatmospheric pressure are capable of operating also with air only under superatmospheric pressure. An example of these is shown in U.S. Patent No. 2,623,782 to Gustafson. If an atomizer such as that of Gustafson were used in my system, the constant level water tank 8 of Fig. 1 would preferably be replaced by suitable means to feed water to the atomizers under controlled superatmospheric pressure. Fig. 4 shows diagrammatically how the invention is applied to a humidifying system of this type, the remaining portion of the installation to the left of pocket 64b being essentially the same as in Fig. 1.

Operation of the system of Fig. 4 is as follows: With humidifiers spraying and relative humidity in the enclosure increasing to near the percentage for which humidistat 12 is adjusted, water valve 58b gradually restricts flow of water in pipe 20b. Check valve 82 prevents water from escaping through vent 66b while water in pipe 74b is under superatmospheric pressure. As room relative humidity rises closer to the predetermined level, valve 58b closes further whereupon pressure in pipe 20b eventually falls below atmospheric and a variable water level is established in pipe 74b of the pocket. This permits continuous operation of the humidifiers at a rate of spray output which may be modulated reliably over a very much wider range than would be possible without the novel control means. If desired modulation may be achieved by use of hand valve 56b instead of automatic valve 58b.

A modification of the pocket construction of Fig. 5 is disclosed in Fig. 6. This arrangement in no way changes the operation of the system as applied to atomizer of the gravity or suction type. It provides a piping construction which may be preferred in certain installations. It is applicable if constant level water tank 8 is used or if water is supplied directly under pressure to pipe 20.

The gradual-acting valve 58 is connected by a pipe 84 to pipe 86 by means of the fitting 88. The lower end of pipe 86 has a coupling 90 permitting connection to a valve 92 by pipe section 94. The upper end of pipe 86 is closed by a fitting 96 with an outlet 98 leading to a fitting 100 from the upper side of which extends vent pipe 102. Within vent pipe 102 and spaced from the interior walls thereof is the upper end of overflow pipe 104 which leads downwardly to fitting 106 which is connected to valve 92 and open drain pipe 108.

Within the pipe or leg 86 is smaller pipe or leg 110, the lower end of which is open as at 111. Pipe 110 extends through the upper end of fitting 96 in a watertight manner and is connected with pipe 2.

From the foregoing description of the construction of Fig. 6, it can be seen that water passing through valve 58 will flow through pipe 84 into pipe 86 and thence upwardly through smaller pipe 110 entering at the open lower end 111 to pass through pipe 2 and associated connections 54 to the atomizers 6. The pipes or legs 86 and 110 together constitute the equivalent of the pocket disclosed in Figs. 1 and 5 and the level 112 of the water in pipe 86 will be the same at any moment as it would be if pocket 64 or 77 were used.

The overflow mechanism of Fig. 6 is designed to limit the maximum water level to the upper end 114 of overflow pipe 104. The upper end 114 is preferably a little less than four inches below the outlets of the humidifiers such as 24 in Figs. 2 and 3. As the water level rises in pipe 86 as, for example, by increased opening of valve 58, the water will under some circumstances pass laterally through connection 98 to rise in short pipe 102 until (in cases where there is no controlling means such as valve 26 of Fig. 1) it may overflow into the open upper end 114 of overflow pipe 104 from which it will run to the drain through open pipe 108. Valve 92 is normally closed but may be opened in order to drain pipes 2, 110 and 86 if desired during periods of non-operation of the humidifying system.

As in Fig. 5, hand valve 56 may be inserted in water line 84 of Fig. 6 for use in conjunction with or in place of automatic valve 58. In cases where the construction of Fig. 6 is used, including valve 58, and where constant level water tank 8 is dispensed with, it is important that water piping be of proper size and that valve 58 be of suitable water flow and pressure characteristics to furnish all the water which may be needed for full capacity operation of all humidifiers 6 without, at the same time, producing pressure enough for the water to rise above end 114 of overflow pipe 104 and to waste excessively when valve 58 is open. Commercial valves are available to meet required specifications of valve 58 in a variety of cases.

In some installations embodying the invention one or more pockets of the type illustrated at 77 of Fig. 1 may be employed and pocket 64 or 86 need not be used. Pocket 77 is comprised of first and second legs 79 and 81. When a pocket of type 77 is located elsewhere than at the end of the water line, it may be attached in the same manner preferably as illustrated at 99 in Fig. 7 or pipe 77 may be attached to pipe 2 between humidifiers. This pocket which comprise first and second legs 79 and 81 desirably includes a vent 78 and means for occasional drainage, as at 80.

If desired, pipes or tubes 74, 79 or 86 may be made of transparent material so that water level therein may be visible.

The preferred depth of pocket 64, 77 or 86 is dependent (1) upon the characteristics of atomizers 6 to be used in the system, (2) upon the maximum and minimum pressures to be maintained in air pipe 4 when atomizers 6 are delivering spray, and (3) upon whether it is desired to modulate the rate of spray output from maximum all the way down to zero or to some other predetermined minimum. The invention imposes no definite limitation on the amount of variation in water level which may be involved. If, for example, the air pressure in pipe 4 to the humidifiers is to be maintained constantly at 30 pounds per square inch gage and if it is desired to modulate spray output from maximum down to zero, tests may be run on one or more atomizers of the type to be used and with water level variably maintained to determine the maximum lift against which these particular atomizers will continue to deliver spray. This lift may be as much as six feet or more in some instances. In cases where air presure in pipe 4 is to be say, 20 pounds gage instead of 30 or if air pressure is to be reduced gradually and simultaneously with restriction in flow of water through valve 58, maximum lift at which spray ceases will be correspondingly lessened. In cases where on-and-off air valve 18 is to be used there can be a still further reduction in the maximum lift to be provided for. In any case the maximum distance from atomizers 6 to the effective bottom of the water pocket should be at least equal to the maximum lift required under any optional circumstances which may be expected to exist. This can be readily determined by the designer of the system after one or more trial operations.

The preferred vertical location of water line 2 is two or three inches below the normal water level 22 in tank 8, or six to seven inches below outlet 24 of atomizers 6. It is customary practice to locate atomizers 6 well overhead, perhaps nine or ten feet above the floor. In some installations it may be more convenient to extend water tubes 54 downwardly to pass through the floor and to relocate pipe 2 at the ceiling of the floor below. This produces an unusually deep water pocket.

The preferred cross-sectional area of the leg of the water pocket in which a variable water level is maintained, such as 74 of Figs. 1 and 5, 79 of Figs. 1 and 7, or annular area at 112 of Fig. 6, is approximately the same as the internal cross-sectional area of water pipe 2. This area should be small enough to insure that the height of the water level will respond quickly to variations in rate of flow of water through valve 58 and/or valve 56, or to variations in moisture output of humidifiers 6, or to the difference between these rates at any particular time.

It is to be emphasized that the particular embodiments of the invention described herein are of an illustrative character and not restrictive. Various changes in form, construction and arrangement of parts may be made within the spirit and scope of the following claims.

Having thus described the invention, what is claimed as new and desired to be secured by Letters Patent is:

1. A humidifying system for an enclosure comprising means including a plurality of water vaporizing units of the atomizer type for providing continuous humidification of the enclosure at a rate lower than the maximum capacity of said units when less than maximum output of said units is required to maintain the enclosure condition, said means comprising a piping system for supplying water to said units from a level below the outlets of said units, a conduit for supplying air under superatmospheric pressure to said units, a valve at the entrance to said water piping system for supplying water continuously to the system during normal operation, means for modulating said valve in accordance with the enclosure condition and thereby varying the rate of flow of water therethrough, said piping system including means between said valve and units for maintaining a variable water level therein by which, as a consequence of one or more units being shut off, the rate of water output of each of said units which remain in operation is increased, said last named means comprising a vertically extending pocket which receives the water flowing from said valve into said system and serves as a pool from which water is withdrawn, said pocket having a vertical length in the order of several feet below the outlets of said units and comprising a first leg in which said variable water level is maintained, the horizontal cross-sectional area of said first leg being in the order of a few square inches or less, and a discharge leg leading to said units with its lower entrance end leading from the lower end of said first leg.

2. A humidifying system for an enclosure as set forth in claim 1, the said means for modulating said valve in accordance with the enclosure condition comprising a humidistat in said enclosure, and means operable by said humidistat for causing the modulation of said valve in accordance with changes in the humidity of the atmosphere in said enclosure.

3. A humidifying system for an enclosure as set forth in claim 1, and a valve in said air conduit, means for modulating said air valve, the means for modulating said water valve and said air valve comprising a humidistat located in said enclosure, and means operable by said humidistat for causing the modulation of said water and air valves.

4. A humidifying system for an enclosure comprising a plurality of water vaporizing units of the atomizer type, a conduit for supplying air under superatmospheric pressure to said vaporizing units, a water supply having a substantially fixed level which is below the outlets of said vaporizing units, a first conduit connected to said water supply below said fixed level, a valve in said first conduit, means for modulating said valve in accordance with variations in atmospheric condition in said enclosure and varying the rate of flow of water therethrough, a second conduit connected to the water entrances of said vaporizing units, a water pocket comprising first and second legs, said first leg receiving water from the outlet side of said valve through said first conduit, said first leg having a small cross-sectional area in the order of a few square inches or less and a large vertical depth in the order of several feet below said fixed water level, said second leg connected at or close to the bottom of said first leg and being a component of said second conduit, such that the water level in said first leg is quickly and widely responsive to variations in the said rate at which water is supplied through said valve and also to the total rate of moisture output from said vaporizing units, whereby with operating conditions stable if one unit is stopped or if its atomizing ability is impaired the water level in the first leg will rise, thus increasing the humidifying output of the units which are spraying so that a substantially constant total rate of humidification will continue as long as the rate of flow of water through said valve remains constant and as long as the water level in said first leg remains below the fixed level of said water supply, thereby to provide continuous humidification at a rate constantly subject to variation.

5. A humidifying system for an enclosure as set forth in claim 4, the said means for modulating said valve in accordance with the enclosure condition comprising a humidistat in said enclosure, and means operable by said humidistat for causing the modulation of said valve in accordance with changes in the humidity of the atmosphere in said enclosure.

6. A humidifying system for an enclosure as set forth in claim 4, and a valve in said air conduit, means for modulating said air valve, the means for modulating said water valve and said air valve comprising a humidistat located in said enclosure, and means operable by said humidistat for causing the modulation of said water and air valves.

References Cited in the file of this patent

UNITED STATES PATENTS

| | | |
|---|---|---|
| 1,200,890 | Schuttler et al. | Oct. 10, 1916 |
| 1,270,159 | Hodge | June 18, 1918 |
| 2,434,421 | Loepsinger | Jan. 13, 1948 |
| 2,913,184 | Parlin | Nov. 17, 1959 |

FOREIGN PATENTS

| | | |
|---|---|---|
| 21,952 | Great Britain | 1913 |